United States Patent [19]

Meihua

[11] Patent Number: 5,024,271

[45] Date of Patent: Jun. 18, 1991

[54] PERMANENT-MAGNET WAX-PROOF DEVICE

[75] Inventor: Wang Meihua, Baotou, China

[73] Assignee: Baotou Institute of Applied Design of New Materials, Baotou, China

[21] Appl. No.: 294,818

[22] Filed: Jan. 9, 1989

[51] Int. Cl.$^5$ .................. E21B 37/00; F17D 1/08
[52] U.S. Cl. .................. 166/66.5; 166/105; 137/13; 210/222
[58] Field of Search .............. 166/66.5, 105; 137/2, 137/13, 803, 833; 175/320; 210/222, 695

[56] References Cited

U.S. PATENT DOCUMENTS

| 2,652,925 | 9/1953 | Vermeiren | 210/222 |
|---|---|---|---|
| 3,228,878 | 1/1966 | Moody | 210/695 |
| 3,345,594 | 10/1967 | Vermeiren | 210/222 |
| 3,637,033 | 1/1972 | Mayall | 106/66.5 |
| 4,265,754 | 5/1981 | Menold | 210/222 |
| 4,278,549 | 7/1981 | Abrams et al. | 210/695 |
| 4,367,143 | 1/1983 | Carpenter | 210/222 |
| 4,417,984 | 11/1983 | O'Meara, Jr. | 210/222 |
| 4,519,919 | 5/1985 | Whyte et al. | 210/695 |
| 4,605,498 | 8/1986 | Kulish | 210/695 |
| 4,611,615 | 9/1986 | Petrovic | 137/13 |

FOREIGN PATENT DOCUMENTS

| 0590438 | 1/1978 | U.S.S.R. | 166/66.5 |
| 1190006 | 11/1985 | U.S.S.R. | 166/66.5 |

Primary Examiner—Bruce M. Kisliuk
Attorney, Agent, or Firm—Rines and Rines

[57] ABSTRACT

A permanent magnet wax proof device includes one or more than one magnetic pole pairs, each of which includes two magnetic circuit units, each said unit comprises radially oriented magnets cooperating with axially or circumferentially oriented magnets or both, resulting in high concentration of magnetic field in oil flow so as to effectively decrease oil viscosity and suppress the process of wax accumulation on the wall of an oil pipe in an oil well or pipelines for conveying oil. This invention provides embodiments which can be connected to oil pipes and sucker rods respectively. This device consumes no power.

15 Claims, 4 Drawing Sheets

PERMANENT-MAGNET WAX-PROOF DEVICE

INTRODUCTION

The present invention relates to a kind of wax-proof device, particularly useful for the oil pipes of oil wells to slow and suppress the process of wax (paraffin) accumulation, it can also be used in pipelines to transfer crude oil and for the same purpose.

BACKGROUND

There is a certain amount of wax ranging from 1% to 50% in crude oil produced everywhere. For example, in China the wax contained in crude oil amounts to more than 10%. The yield of an oil well is affected negatively by wax precipitating from oil and accumulating on the inside wall of the oil pipes. As a result, wax even blocks the oil well.

Although traditional wax-proof and wax-cleaning methods are somewhat effective, they consume a great deal of energy, require additional equipments and professional operators, and make the exploitation process complicated and the oil product cost high. For example, wax proof methods adding chemical preparations, thermodynamic methods for raising oil temperature, and wax-cleaning such as pouring hot water, vapor or hot oil into the oil well or scraping away the wax mechanically from oil pipe wall, all lead to the high oil production cost and make the maintenance of oil well complicated.

The inventor of this invention developed earlier in 1984 a new device connected in series with the oil pipe of an oil well to suppress the process of wax precipitation, it is effective to some extent, but said device contains only radially oriented permanent magnets, magnetic field generated therefrom can not be concentrated highly in the central area of oil flow, so it is unable to meet the need of oil wells where a strong magnetic field is required. Moreover, such a device can not be connected in series with the sucker rod used in oil-pumping wells as necessary in practice.

The main object of the present invention is to present an essentially improved permanent-magnet wax-proof device which highly concentrates in the main area of oil flow the magnetic field produced by radially oriented permanent magnets, and provides thus a series of more effective devices.

The further important object of the invention is to provide a kind of permenant-magnet wax-proof device which can particularly be connected in series with very long and thin sucker rods within the oil pipe and which has the advantage of being small in size, light in weight, and easy to be installed and dismantled. In addition, a combination use of all the above mentioned permanent-magnet wax-proof devices of this invention will lead to very good wax-proof effects as will be illustrated in the following description.

Other advantages and applications of the invention will become apparent from the following description when read in conjuction with the accompanying drawings.

BRIEF DESCRIPTION

Two connectors are separately threaded on and welded to both ends of a non-magnetically conductive hollow core tube to form a rigid integral whole. The open ends of said two connectors have male or female screw threads for connecting with an oil pipe. A protective tube made of magnetically conductive material with its inner diameter larger than the outer diameter of the core tube is coaxially located outside said core tube by means of one of said connectors at one end of said protective tube and a tube nut at the other end. Said tube nut plugs in and presses tightly at said other end of the protective tube. One or more than one magnetic pole pair which form a magnetic circuit system are placed in the ring space between said core tube and said protective tube, and are alined axially on the outer surface of said core tube. Each said magnetic pole pair consists of two magnetic circuit units arranged in axial symmetry (or assymetry) in the same cross section of said core tube in a state of mutual attraction. The gaps remaining in said ring space are filled with filling material, such as epoxy resin, so as to keep the magnetic pole pairs in position and prevent the magnetic circuit system from being permeated or damaged by oil or gas. All the adjacent elements used to form each said magnetic circuit unit are stuck together with adhesive, and so are the magnetic circuit units glued to the core tube.

The present invention can also be formed as follows:

A sleeve made of magnetically conductive high strength material has a left portion and a right portion. The right (head) portion can directly be connected to an oil pipe and has a minimum inner diameter section adjacent to the left (tail) portion. The tail portion is connected to an end connector which has an inner diameter equal to said minimum inner diameter of said head portion and less than that of said tail portion. A thin wall core tube with its inner diameter equal to that of said end connector is located coaxially inside the tail portion. Two flanges are separately welded to the two ends of said core tube. A magnetic circuit system similar to that mentioned above is arranged in the ring space between said tail portion and said core tube, and the gaps remaining in said ring space is filled with adhesive. Two oil-proof ring washers are respectively pressed tightly between two gaps formed by one said flange and said end connector as well as by the other flange and the right portion. It is simple in structure. The core tube is not subject to loading, so the wall of said core tube is thin, resulting thus in increasing magnetic field strength with oil flow, as the field strength is inversely proportional to the third power of distance. Said core tube and said two flanges are made of non-magnetically conductive high strength steel. The construction of each above-said magnetic circuit unit is as follows:

Two identical radially oriented tile magnets are glued together side by side circumferentially and stuck on the outer surface of said core tube with adhesive. The four sides along the periphery of each radially oriented tile magnet are preferably planes, two of which extend axially and the other two extend circumferentially, and the top and bottom surfaces facing radially are convex surface and concave surface respectively. The radius of curvature of the concave surface is the same as that of the outer surface of said core tube. Two magnetically conductive top slices cover closely the two convex surfaces separately with their adjacent surfaces indentical to each other.

Starting from each of the two circumferentially extended planes of each said radially oriented tile magnet and on the outer surface of said core tube, there is closely aligned side by side in the axial direction an axially oriented side magnet and a magnetically conductive side slice successively. As for the shape and size, each said axially oriented side magnet and each said side slice are the same as the radially oriented tile magnet with the exception that their axial dimentions are different from each other. Said side slices are made of magnetically conductive material such as soft iron.

Being arranged in the way mentioned above, two axially extended planes are formed jointly by said two radially oriented tile magnets and four axially oriented side magnets. Each of said jointly formed axially extended planes is stuck with a circumferentially oriented strip magnet which has five planes and one concave surface in accordance with the outer surface of the core tube. The other axially extended plane of each circumferentially oriented strip magnet is stuck with a magnetically conductive strip slice. All the adjacent surfaces are glued tightly together with adhesive, such as epoxy resin.

Other forms of magnetic circuit units can be obtained for example by combining together two radially oriented tile magnets, two circumferentially oriented strip magnets, two magnetically conductive strip slices, and two magnetically conductive top slices; or by combining two radially oriented tile magnets, four axially oriented side magnets, four magnetically conductive side slices, and two magnetically conductive top slices together; or where only low magnetic field strength is required, a combination of two radially oriented tile magnets, and two magnetically conductive top slices can be used. The arrangements of said forms are similar to that mentioned above.

Two above-said magnetic circuit units which are arranged in axial symmetry or not in axial symmetry but in the same axial section of the core tube constitute one magnetic pole pair. Said two magnetic circuit units are arranged in a state of mutual attraction or mutual repulsion, preferably mutual attraction. Said magnetic pole pairs are arranged one after another along the outer surface of the core tube parallelly or circumferentially shifted between two adjacent magnetic pole pairs. Each magnetic pole pair covers a central angle ranging from 10 to 360 degrees.

The magnetic polarization of the concave surfaces of said radially oriented tile magnets are the same as that of the adjacent stuck surfaces of the axially oriented side magnets and of the circumferentially oriented strip magnets. In this way, the magnetic field is highly concentrated in the oil flow which passes through the hollow space of the core tube so as to effectively slow the process of wax precipitating from oil, and decrease the viscosity of oil.

It is a neccessity in practive to develope a novel device especially useful for oil-pumping wells. Such permanent-magnet wax-proof device is connected in series to the sucker rod. Instead of the hollow core tube used in previous stated inventions a solid short sucker rod section made of magnetically conductive high strength steel material is adopted. Said sucker rod section has a sunken portion in the middle part where the outer diameter is smaller than that of the two end portions of the sucker rod section. A protective tube is located coaxially outside the sunken portion so as to form a ring space in which a magnetic circuit system is placed. Said protective tube is connected to one of said end portions directly, and is pressed tightly in position on the other end portion with a tube nut. Said protective tube is made of non-magnetically conductive high strength steel. Said protective tube can also be of glass fibre reinforced plastic which is made from fibre cloth mixed with epoxy resin and wound on the outside surface and at the two ends of the magnetic circuit system after filling the ring space with filling material such as epoxy resin. In this case, said end connector is not needed.

An improvement of said sucker rod connected permanent-magnet wax-proof device resides in providing on each of said two end portions two rotating disk type straightening devices, each of which is located in a penetrated slot and is rotatably installed with a pin to said end portion. The plane of each said straightening device passes through and is axially symmetrical to the axial line and the diameter of said plane is larger than the maximum diameter of said sucker rod section. Said four straightening devices are mutually shifted circumferentially by a central angle of 45 degrees, and are separated in the axial direction. The aim of said straightening devices so designed and arranged is to prevent the permanent-magnet wax-proof device from impacting the oil pipe wall and resulting in wear and tear when the long and thin sucker rod moves up and down.

The distribution and arrangement of all the elements contained in this magnetic circuit system are basically similar to that in the magnetic circuit system installed on the hollow core tube, with the execption that the magnetic polarlization of the concave surfaces of said radially oriented tile magnets is opposite to that of the adjacent stuck surfaces of the axially oriented side magnets and of the circumferentially oriented strip magnets; that the magnetically conductive top slices must be omitted; and that the concrete dimensions are different. With the above-mentioned exceptions, the other forms of magnetic circuit unit used in the oil pipe connected permanent-magnet wax-proof device mentioned above can also be used in the sucker rod connected permanent-magnet wax-proof device.

With such essential improvement, the volume and weight of the permanent-magnet wax-proof device connected to sucker rod is at least 60% less than that of the permanent-magnet wax-proof device connected with an oil pipe. It thus not only saves a lot of materials, reduces production cost, but also simplifies maintenance and expands the practical application. For example, a single permanent-magnet wax-proof device connected with an oil pipe or sucker rod at a distance of hundred or thousand meters away below wellhead sometimes shifts wax accumulation point to a place near and below the wellhead. It is desirable and much convenient to connect another permanent-magnet wax-proof device in series with the sucker rod at a point near and below said place so as to move the wax accumulation point out of the well. Or when an oil pipe-connected permanent-magnet wax-proof device below an oil pump is beyond its service life, it is much more convenient to place one or more sucker rod-connected permanent-magnet wax-proof devices in series with the sucker rod at appropriate places than to take out the oil pipe and replace the old with a new one in series with the oil pipe, which is a very troublesome task.

DETAILED DESCRIPTION AND EXAMPLE

The following is the detailed description in connection with the accompanying drawings.

Figure 1:
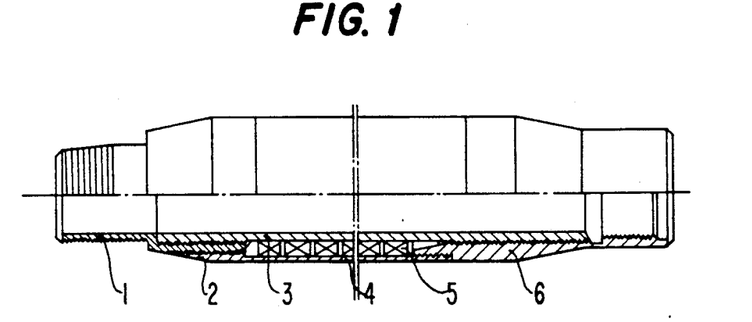
FIG. 1 is an illustrative diagram of an embodiment connected in series with an to oil pipe in an oil well and having a hollow core tube.
Figure 3:
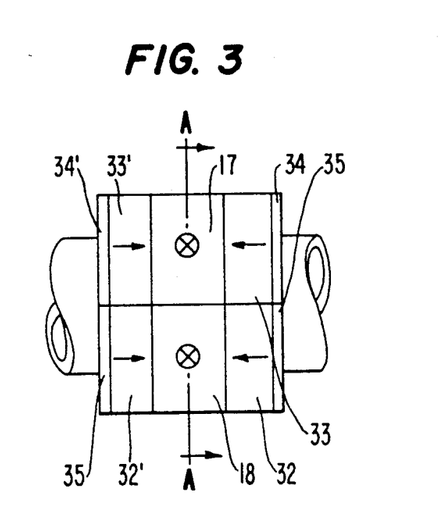
FIGS. 3 and 4 are illustrative diagrams representing respectively a front view and a sectional view on the line A—A in FIG. 3 of one magnetic pole pair installed on the hollow core tube.
Figure 4:
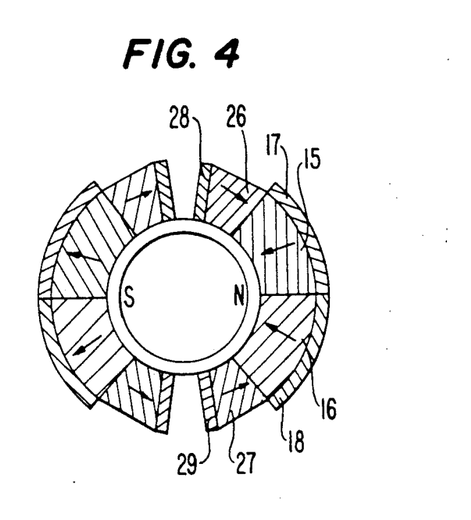
Figure 7:
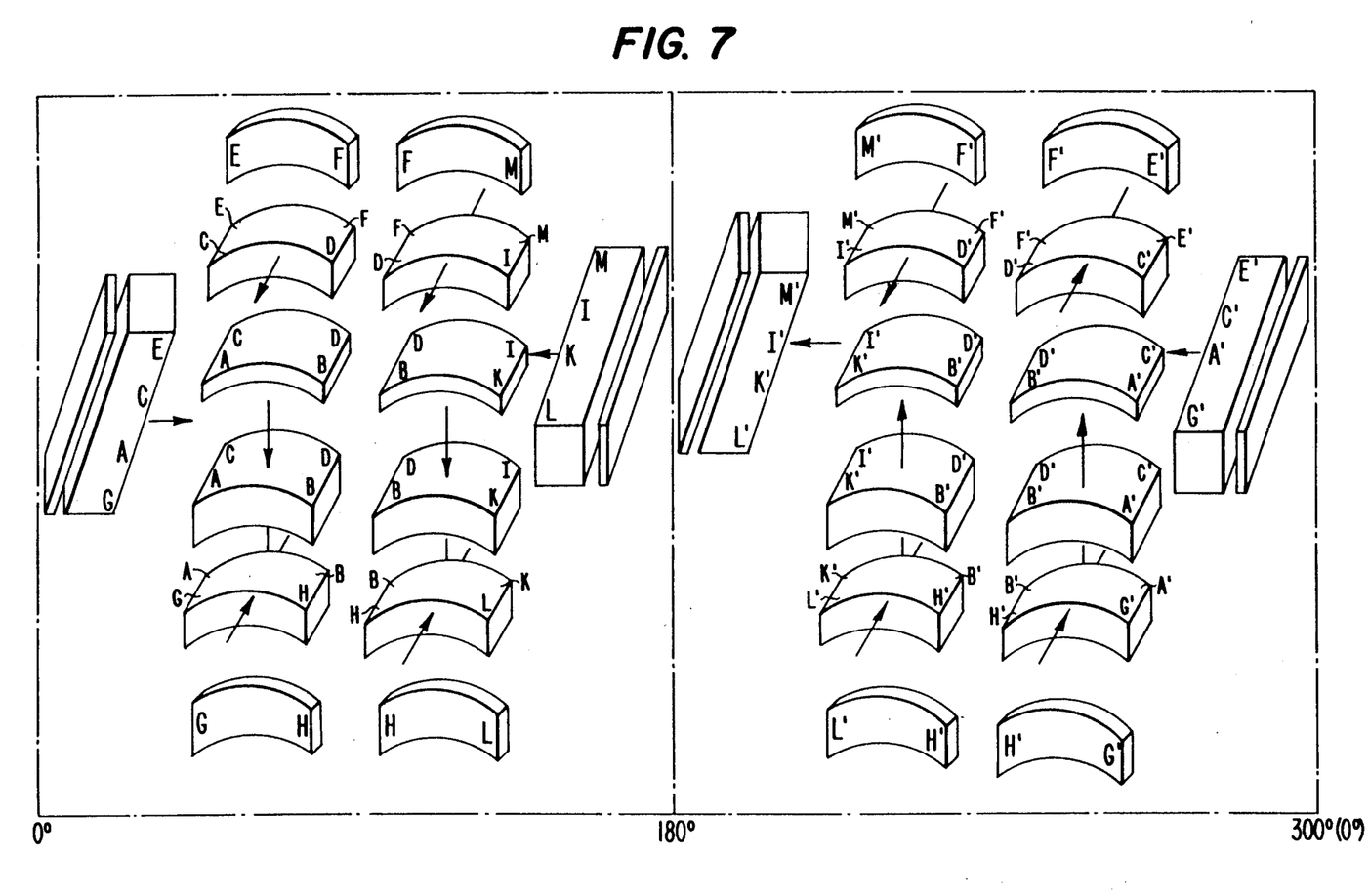
FIG. 7 is a perspective diagram to show the relative distribution of the permanent-magnets and magnetically conductive slices contained in the embodiments of FIGS. 3 and 4. The same letters in the diagram represent the same spacial position, coinciding with each other after assembling.

As shown in FIG. 1, a core tube (3) with screw threads at its both ends is made of austenite stainless steel 1Cr18Ni9Ti or other appropriate non-magnetically conductive materials. Connectors (1) and (6) having threads are made of 40Cr, 35CrMo, 40CrNiMo or other appropriate magnetically conductive materials. Said connectors are threaded respectively onto both ends of said core tube then welded thereto so as to form an integral whole. A protective tube (4) made of magnetically conductive high strength steel tube is mounted coaxially outside said core tube, and is tightly pressed in position by a tube nut (2) which is threaded on the connector (1) and extends into said protective tube (4). Said tube nut is made of the same material as that of said two connectors, and has a conical outer surface as shown in FIG. 1 to serve as a guide in assembling. The outside diameter of said protective tube is smaller than the inner diameter of the casing pipe of an oil well. One or more magnetic pole pairs are placed in the ring space between the inner surface of said protective tube (4) and the outer surface of said core tube (3). The gaps in the ring space are filled with filling material, such as epoxy resin so as to fix them in position and prevent the elements used to form the magnetic circuit system from being corroded by water, vapor or oil. Two magnetic circuit units constitute one magnetic pole pair. Each magnetic circuit unit comprises the following elements as shown is FIGS. 3 and 4, the distribution of elements being shown in FIG. 7:

Two identical radially oriented tile magnets (15, 16), two identical magnetically conductive top slices (17, 18), four identical axially oriented side magnets (32, 33, 32'33'), four identical magnetically conductive side slices (34, 35, 34'35'), two identical circumferentially oriented strip magnets (26, 27) and two identical magnetically conductive strip slices (28, 29).

Said two radially oriented tile magnets are closely arranged side by side circumferentially on the outer surface of said core tube (3). The convex surface of each said radially oriented tile magnet (for example 15) is completely covered by a concave surface of one said top slice (17).

Starting from each of the two circumferentially extended planes of each said radially oriented tile magnet (for example 15) and on the outer surface of the core tube, there is aligned closely side by side in the axial direction an axially oriented side magnet (for example 33 or 33') and a side slice (for example 34 or 34') successively. The shape and size of each said axially oriented tile magnet and each said magnetically conductive side slice are just similar to the radially oriented tile magnets with the exception that their axial dimentions are different from each other. Said side slices are made of magnetically conductive material, such as soft iron.

Being arranged in the way mentioned above, two circumferentially oriented strip magnets (26, 27) are stuck separately to the two axially extended surfaces formed jointly by said two radially oriented tile magnets and said four axially oriented side magnets. On the other axially extended surface of each said strip magnet (26 or 27) one magnetically conductive strip slice (28 or 29) is stuck.

Except the top slices (17, 18), all said elements mentioned above are stuck tightly to the core tube (3), in addition all the other adjacent surfaces are stuck tightly together too with adhesive such as epoxy resin etc..

Two magnetic circuit units which are arranged in axial symmetry or not in axial symmetry but in the same section of the core tube form one magnetic pole pair. The magnetic polarizations on the opposite concave surfaces of said two magnetic circuit units are in a state of mutual attraction or mutual repulsion, preferably of mutual attraction. The magnetic pole pairs are arranged one after another along the outer surface of the core tube (3). The relative circumferential positions between said magnetic pole pairs are not limited. In addition, the magnetic polarization of the concave surface of each said radially oriented tile magnet (for example 15) is the same as that of the adjacent stuck surfaces of the two axially oriented side magnets (33, 33') and of the circumferentially oriented strip magnet (26), said surfaces being stuck to their common adjacent radially oriented tile magnet (15).

All the above-mentioned magnets are made of rare earth magnetic materials, such as SmCo5 CeCoCuFe, PrSmCo5, Sm2Co17 NdFeB or permanent-magnet ferrite or other appropriate permanent-magnet materials selected according to concrete situations such as enviromental temperature, required magnetic field strength etc. All the above-mentioned magnetically conductive side slices, top slices and strip slices are made of magnetically conductive materials such as soft iron.

Figure 2:
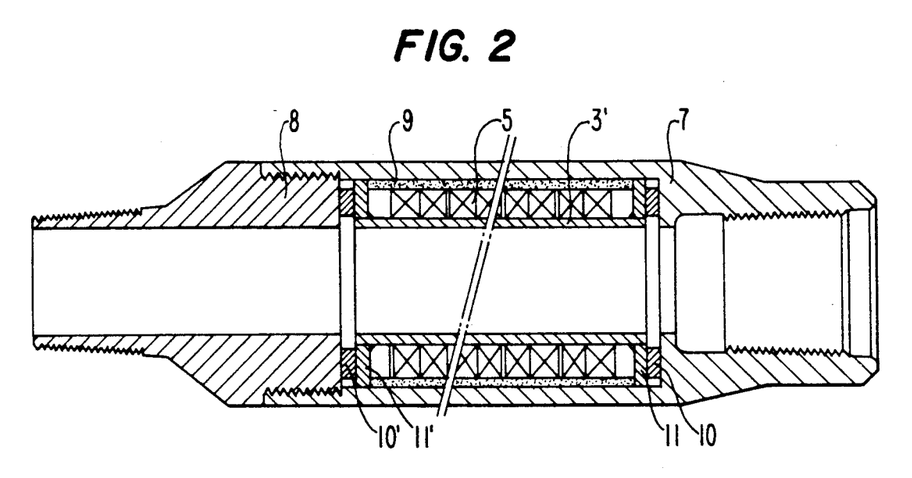
FIG. 2 is an illustrative diagram of another embodiment of the invention connected in series with an to oil pipe and having a hollow core tube with a thinner wall than that of the core tube shown in FIG. 1, said thinner wall not being subject to loading.

FIG. 2 shows another embodiment of the invention. A magnetically conductive sleeve (7) is in threaded connection with an magnetically conductive end connector (8), and two oil-proof ring washers (10, 10') and a thin wall non-magnetically conductive stainless steel core tube (3') are placed inside the sleeve. There are two non-magnetically conductive flanges (11, 11') welded respectively at both ends of said core tube. One or more than one magnetic pole pairs which form a magnetic circuit system identical to that mentioned in reference with FIGS. 1 and 3 are placed in the ring space between said sleeve and said core tube. The gaps between magnetic circuit units are filled with fillings (9) such as epoxy resin.

Figure 5:
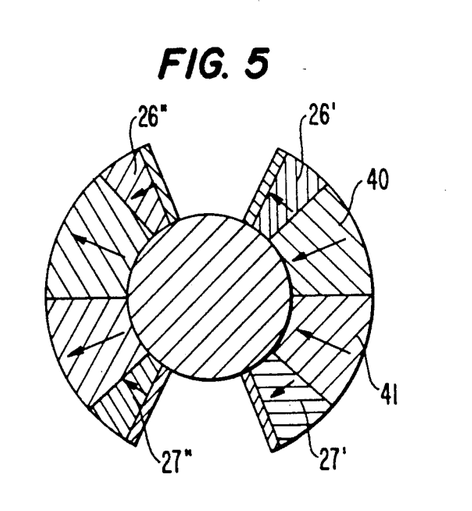
FIGS. 5 and 6 are illustrative diagrams representing respectively a front view and a sectional view on the line B—B in FIG. 5 of one magnetic pole pair mounted on the short solid sucker rod section.
Figure 6:
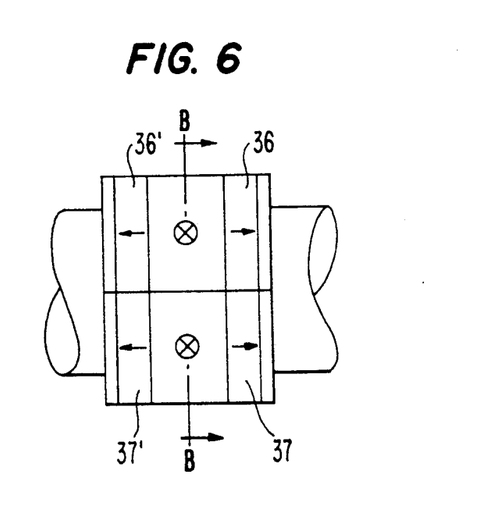
Figure 8:
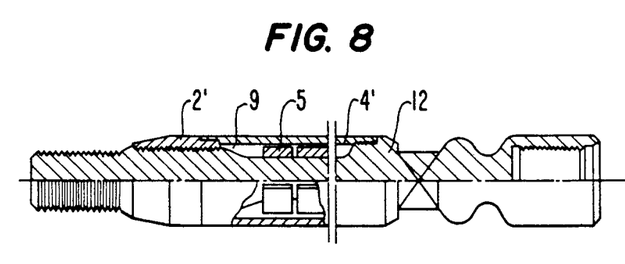
FIG. 8 is a developed embodiment of the invention having a short solid sucker rod section.

A further embodiment of the invention is illustrated in FIG. 8. A short solid sucker rod section (12) having at both ends threads in accordance with that of the sucker rods of oil-pumping wells has a sunken portion in the middle part. A protective tube (4') with its inner diameter larger than the outer diameter of said sunken portion is mounted coaxially outside the sunken portion. A tube nut (2') is plugged in and tightly keeps said protective tube in position. The maximum outer diameter of this embodiment must be smaller than the outer diameter of the go-between used to connect two adjacent sucker rods of an oil well together so as to avoid damming oil flow. A magnetic circuit system is placed in a ring space between said protective tube and the sunken portion. As will become clear in reference to FIGS. 5 and 6, the distribution and arrangement of all the elements contained in this magnetic circuit system are similar to that in the magnetic circuit system illustrated in FIGS. 3 and 4, with the exception that the magnetic polarization of the cancave surface of each said radially oriented tile magnet (for example 40) is opposite to that of the adjacent stuck surfaces of the two axially oriented side magnets (36,36') and of the circumferentially oriented strip magnet (26'), said surfaces being stuck to their common adjacent radially oriented tile magnet (40); that the magnetically conductive top slices must be omitted and that the concrete dimensions are different from each other. The gaps between said magnetic circuit units are filled with filling material such as epoxy resin etc.

The protective tube is made of austenite stainless steel 1Cr18Ni9Ti or other appropriate non-magnetically conductive materials. The sucker rod section (12) is made of magnetically conductive high strength steel, such as 40CrMo subject to heat treatment. The material of the tube nut is steel 40Cr etc.

Figure 10:
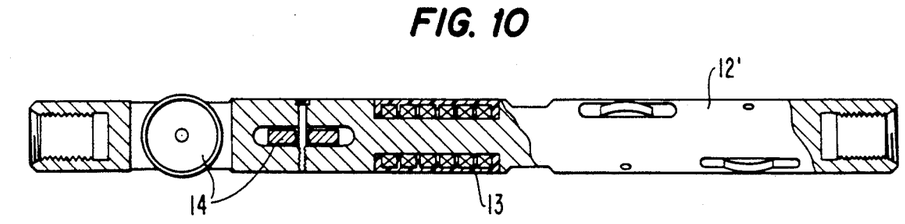
FIG. 10 is another embodiment of the invention which has a short solid sucker rod section, four straightening devices, and a protective tube made of glass fibre reinforced plastic.

The protective tube can also be made of glass fibre reinforced plastic with somewhat difference in structure as will be apparent in the endodiment shown in FIG. 10. This embodiment is connected in series with the sucker rod within the oil pipe near and below a wax accumulation point. Two or more such embodiments can be used in combination or in combination with the oil pipe-connected permanent-magnet wax-proof device and placed at appropriate positions of the sucker rod.

FIG. 10 shows an improved embodiment over that shown in FIG. 8, wherein the protective tube (13) is made of glass fibre reinforced plastic. The magnetic circuit system is similar to that shown in FIG. 8. There are two penetrated slots on each of the end portions. A rotating disk type straightening device (14) is placed in each said slot and is rotatably supported onto relevant portion with a pin. The plane of each said straightening device passes through and is symmetrical to the axial line. The diameter of each said plane is larger than the maximum outer diameter of said sucker rod section, said four straightening devices shifts being oriented circumferentially of each other by a central angle of 45 degrees. With the aid of the straightening devices the permanent-magnet wax-proof device will not be worn out due to its collision with the oil pipe wall when the long sucker rod moves up and down.

Some of the advantages of the embodiments shown in FIGS. 8 and 10 and their combination uses have been described in the "brief description".

Figure 9:
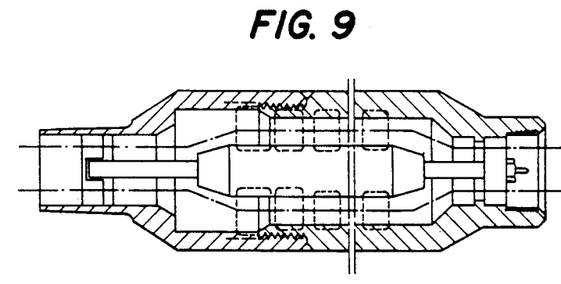
FIG. 9 is a further embodiment derived from that shown in FIG. 8.

Another embodiment derived from that shown in FIG. 8 in illustrated in FIG. 9.

It should be understood that the main purpose of adding the axially oriented side magnets or the circumferentially oriented strip magnets or both of them to the radially oriented tile magnets is to suppress the leakage magnetic field generated by said radially oriented tile magnets so as to significantly concentrate and thus enhance the field strength in the main area of oil flow.

Under otherwise identical main conditions, the magnetic field strength in the main area of oil flow generated by the embodiment shown in FIG. 3 for example is twice (or even more) as strong as that produced by the device of prior art using only radially oriented permanent magnets.

The effects on prolonging wax-cleaning period, increasing crude yield, oil saving energy, decreasing viscosity of oil etc. are obvious. The following is one of the practical examples:

In a certain oil field test, 227 oil wells were provided in 1987 one after another with the inventive devices. The average heat-cleaning period extended from 23 days before using said permanent-magnet wax-proof devices to 95 days after using the devices. The crude oil yield increased by more than 7,000 tons.

Better results have been obtained in most test cases in practice. For example: 31 oil wells were equipped in 1987 with the present inventive devices, which produce central magnetic field strength ranging from 1000 to 4000 Gs selected according to concrete situations of oil wells by Oil Exploitation Factory No. 1 Xin Jiang Oil Administrative Office China, All are effective. The heat-cleaning period is prolonged by 6 to 12 times. It was most distinct in Hong Shan Ju District that the heat-cleaning period reaches about one year.

It should be understood that the specific embodiments are selected for mere illustrative purpose, obvious modifications and changes therein may be made without departing from the spirit of the invention or the scope of the following claims.

What is claimed is:

1. A permanent-magnet wax-proof device for magnetically treating crude oil streams to enhance their flow properties and to reduce their tendency to deposit paraffin on the interior surface of a conduit or pipe carrying said crude oil, comprising;
   (a) a sleeve with a head portion and a tail portion, said tail portion having an inner diameter larger than the adjacent minimum inner diameter of said head portion, said head portion being connected with an oil conduit and said tail portion being connected with an end connector connected with another oil conduit;
   (b) a core tube with two flanges welded on both ends of said core tube to form an integral assembly having an inner diameter equal to that of said minimum inner diameter, said integral assembly being located coaxially inside said tail portion with a hollow space formed in said core tube to allow the oil flow to pass through;
   (c) two oil-proof ring washers placed at both ends of said flanges respectively;
   (d) an end connector in threaded connection with the end of said tail portion to press said core tube and said two oil-proof ring washers tightly in position, and having an inner diameter equal to that of the core tube, and with its other end connected with said other conduit;
   (e) a magnetic circuit system located on the outer surface of said core tube to produce a highly concentrated magnetic field inside said core tube, in which the direction of the magnetic lines of force is perpendicular to the axial direction of said core tube, and therefore, the direction of the magnetic lines of force is perpendicular to the direction of said oil flow in the core tube, and said magnetic circuit system is composed of one or more magnetic pole pairs, each of which includes two magnetic circuit units;

wherein gaps between said core tube and said sleeve are filled with adhesive, said core tube and said two flanges being made of non-magnetically conductive high strength steel, and said sleeve and said end connector being made of magnetically conductive high strength steel.

2. A permanent-magnet wax-proof device as claimed in claim 1, wherein the magnetic circuit system is composed of one or more magnetic pole pairs, each of which consists of two magnetic circuit units, and each magnetic circuit comprises the following elements:

(a) two identical radially oriented tile magnets stuck together side by side in the circumferential direction on said core tube, each of which has two axially extended planes, two circumferentially extended planes, a convex surface and a concave surface in accordance with the outer surface of said core tube;
   (b) four identical axially oriented side magnets which are identical in size and shape to said radially oriented tile magnets except the axial dimension, and are stuck separately to the four circumferentially extended planes of said two radially oriented tile magnets;
   (c) four identical magnetically conductive side slices which are identical in size and shape to said four axially oriented side magnets except the axial dimension, and are stuck separately to the other four circumferentially extended planes of said four axially oriented side magnets;
   (d) two identical circumferentially oriented strip magnets stuck separately to two axially extended planes formed jointly by said two radially oriented tile magnets and said four axially oriented side magnets;
   (e) two identical magnetically conductive strip slices stuck to the other two axially extended planes of said two circumferentially oriented strip magnets;
   (f) two identical magnetically conductive top slices stuck separately to the two convex surfaces of said two radially oriented tile magnets;

wherein all the above-mentioned elements except the two magnetically conductive top slices are stuck with adhesive to said core tube; all stuck portions of adjacent surfaces in the magnetic circuit unit assembly are identical in shape and size and are stuck together with adhesive; the magnetic polarization of said concave surfaces of the two radially oriented tile magnets is the same as that of the adjacent stuck surfaces of said four axially oriented side magnets and said two circumferentially oriented strip magnets; and all the above-mentioned magnets being permanent magnets.

3. A permanent-magnet wax-proof device as claimed in claim 1, wherein the magnetic circuit system is composed of one or more magnetic pole pairs, each of which comprises two magnetic circuit units, and each magnetic circuit unit comprises the following elements;

(a) two identical radially oriented tile magnets stuck together side by side in the circumferential direction on said core tube, each of which has two axially extended planes, two circumferentially extended planes, a convex surface and a concave surface in accordance with the outer surface of said core tube;
   (b) four identical axially oriented side magnets which are identical in shape and size to said radially oriented tile magnets except the axial dimension, and are stuck separately to the four circumferentially extended planes of said two radially oriented tile magnets;
   (c) four identical magnetically conductive side slices which are identical in shape and size to said four axially oriented side magnets except the axial dimension, and are stuck separately to the other four circumferentially extended planes of said four axially oriented side magnets;
   (d) two magnetically conductive top slices stuck separately to the two convex surfaces of said two radially oriented tile magnets;

wherein:
   all the above-mentioned elements except the two magnetically conductive top slices are stuck with adhesive to said core tube;
   all stuck portions of adjacent surfaces in the magnetic circuit unit assembly are identical in shape and size, and are stuck together with adhesive; the magnetic polarization of the concave surface of said two radially oriented tile magnets is the same as that of the adjacent stuck surfaces of said four axially oriented side magnets and all the above-mentioned magnets being permanent magnets.

4. A permanent-magnet wax-proof device as claimed in claim 1, wherein the magnetic circuit system is composed of one or more magnetic pole pairs, each of which comprises two magnetic circuit units, and each magnetic circuit unit comprises the following elements:

(a) two identical radially oriented tile magnets stuck together side by side in the circumferential direction on said core tube, each of which has two axially extended planes, two circumferentially extended planes, a convex surface and a concave surface in accordance with the outer surface of said core tube;
   (b) two identical circumferentially oriented strip magnets stuck respectively to the two axially extended planes of said two stuck radially oriented tile magnets;
   (c) two identical magnetically conductive strip slices stuck respectively to the two circumferentially oriented strip magnets along the circumferential direction on the outer surface of said core tube;
   (d) two identical magnetically conductive top slices stuck separately to the two convex surfaces of said two radially oriented tile magnets;

wherein:
   all the above-mentioned elements except the two magnetically conductive top slices are stuck with adhesive to said core tube;
   all the stuck portions of adjacent surfaces in the magnetic circuit unit assembly are identical in shape and size, and are stuck together with adhesive; the magnetic polarization of said concave surfaces of the two radially oriented tile magnets being the same as that of the adjacent stuck surfaces of said two circumferentially oriented strip magnets; and all the above-mentioned magnets being permanent magnets.

5. A permanent-magnet wax-proof device connected in series with sucker rods as employed in oil flow systems comprising:

(a) a sucker rod section having a sunken portion between two end portions, said sucker rod section being made of magnetically conductive high strength steel;

(b) a magnetic circuit system composed of one or more than one magnetic pole pairs which are stuck successively with adhesive on the outer surface of said sunken portion, said magnetic circuit system producing and concentrating magnetic field in the outside space of a protective tube, and with oil flow passing through this outside space;

(c) the protective tube made of oil-proof non-magnetically conductive material located coaxially outside said magnetic circuit system;

(d) four identical straightening devices in the shape of a rotating disk, two of which are disposed on one of said end portions, the other two on the other end portion, each said straightening device being placed in a slot passing through said sucker rod section and rotatably installed on said sucker rod, the plane of each said straightening device passing through and symmetrically of the axial line, and the diameter of said plane being larger than the maximum outer diameter of said sucker section; and said four straightening devices being separated in the axial direction and circumferentially shifted by a central angle of 45 degrees.

6. A permanent-magnet wax-proof device as claimed in claim 5, wherein the magnetic circuit system is composed of one or more magnetic pole pairs, each of which includes two magnetic circuit units, each of which comprises the following elements:
    (a) two identical radially oriented tile magnets stuck together side by side in the circumferential direction on said sunken portion, each of which has two axially extended planes, two circumferentially extended planes, a convex surface and a concave surface in accordance with the outer surface of said sunken rod;
    (b) four identical axially oriented side magnets which are identical in shape and size to said radially oriented tile magnets except the axial dimension, and are stuck separately to the four circumferentially extended planes of said two radially oriented tile magnets;
    (c) four identical magnetically conductive side slices which are identical in size and shape to said four axially oriented side magnets except the axial dimension, and are stuck respectively to the other four circumferentially extended planes of said four axially oriented side magnets;
    (d) two identical circumferentially oriented strip magnets stuck respectively to two axially extended planes jointly formed by said two radially oriented tile magnets and said four axially oriented side magnets;
    (e) two identical magnetically conductive strip slices stuck to the other two axially extended planes of said two circumferentially oriented strip magnets;
wherein:
    all the above-mentioned elements are stuck with adhesive to said sunken portion;
    all the stuck portions of adjacent surfaces in the magnetic circuit unit assembly are identical in shape and size and are stuck together with adhesive;
    the magnetic polarization of said two concave surfaces of the two radially oriented tile magnets is opposite to that of the adjacent stuck surfaces of said four axially oriented side magnets and said two circumferentially oriented side magnets; and all the above-mentioned magnets being permanent magnets.

7. A permanent-magnet wax-proof device as claimed in claim 5, wherein the permanent magnet system is composed of one or more magnetic pole pairs, each of which includes two magnetic circuit units, each of which comprises the following elements:
    (a) two identical radially oriented tile magnets stuck together side by side in the circumferential direction on said sunken portion, each of which has two axially extended planes, two circumferentially extended planes, a convex surface and a concave surface in accordance with the outer surface of said sunken portion;
    (b) four identical axially oriented side magnets which are identical in shape and size to said radially oriented tile magnets except the axial dimension, and are stuck respectively to the four circumferentially extended planes of said two radially oriented tile magnets;
    (c) four identical magnetically conductive side slices which are identical in shape and size to said four axially oriented side magnets except the axial dimension, and are stuck respectively to the other four circumferentially extended planes of said four axially oriented side magnets;
wherein:
    all the above-mentioned elements are stuck with adhesive to said sunken portion;
    all the stuck portions of adjacent surfaces in the magnetic circuit unit assembly are identical in shape and size and are stuck together with adhesive; the magnetic polarization of said concave surfaces of said two radially oriented tile magnets is opposite to that of the adjacent stuck surfaces of said four axially oriented side magnets; and all the above-mentioned magnets being permanent magnets.

8. A permanent-magnet wax-proof device as claimed in claim 5, wherein the magnetic circuit system is composed of one or more magnetic pole pairs, each of which includes two magnetic circuit units, each of which comprises the following elements:
    (a) two identical radially oriented tile magnets stuck together side by side in the circumferential direction on said sunken portion, each of which has two axially extended planes, two circumferentially extended planes, a convex surface and a concave surface in accordance with the outer surface of said sunken portion;
    (b) two identical circumferentially oriented strip magnets stuck respectively to the two axially extended planes of said two stuck radially oriented tile magnets;
    (c) two identical magnetically conductive strip slices stuck respectively to said two circumferentially oriented strip magnets along the circumferential direction on the outer surface of said sunken portion;
wherein:
    all the above-mentioned elements are stuck with adhesive to said sunken portion;
    all the stuck portions of adjacent surfaces in the magnetic circuit unit assembly are identical in shape and size, and are stuck together with adhesive;
    the magnetic polarization of said concave surfaces of said two radially oriented tile magnets being opposite to that of the adjacent stuck surfaces of said two circumferentially oriented strip magnets: and all the above-mentioned magnets being permanent magnets.

9. A permanent-magnet wax-proof device as claimed in claim 5, wherein the magnetic circuit system is composed of one or more magnetic pole pairs, and each said magnetic pole pair includes two magnetic circuit units, each of which comprises two identical radially oriented tile magnets stuck together side by side in the circumferential direction on said sucker portion, each of which has a concave surface in accordance with the outer surface of said sunken portion; and wherein all adjacent stuck surfaces are stuck together with adhesive; and said radially oriented tile magnets are permanent magnets.

10. A permanent-magnet wax-proof device as claimed in claim 5, wherein two of said magnetic circuit units are arranged in one of axial symmetry and axial assymmetry in the same cross section of the sunken portion of the sucker rod to constitute one magnetic pole pair, and being arranged in a state of mutual attraction with high magnetic density provided in the direction of the magnetic lines of force perpendicular to the direction of the said oil flow.

11. A permanent-magnet wax-proof device as claimed in claim 10, wherein said magnetic pole pairs are arranged one after another along the longitudinal axis of said sucker rod circumferentially between two adjacent magnetic pole pairs.

12. A permanent-magnet wax-proof device as claimed in claim 10, wherein said magnetic circuit units employ rare earth magnetic material.

13. A permanent-magnet wax-proof device for magnetically treating crude oil streams to enhance their flow properties and to reduce their tendency to deposit paraffin on the interior surface of a conduit or pipe carrying said crude oil and to which the device is connected, said device comprising one or more pairs of magnetic pole pairs each provided with two magnetic circuit units, each such unit comprising radially oriented magnets cooperating with at least one of axially and circumferentially oriented magnets to produce a high concentration of magnetic field in the flowing oil so as effectively to decrease the oil viscosity and suppress the process of wax accumulation upon the walls of the conduit or pipe.

14. A permanent-magnetic wax-proof device as claimed in claim 13 and in which the magnetic circuit units are oriented to direct the lines of force of said magnetic field perpendicularly to the axial direction of the oil flow.

15. A permanent-magnetic wax-proof device as claimed in claim 14 and in which said two magnetic circuit units are of rare-earth magnetic material arranged in a state of mutual attraction.

* * * * *